Nov. 18, 1930.  W. L. SMITH  1,782,370
APPARATUS FOR PREPARING VISCOUS MIXTURES
Filed Aug. 17, 1929  2 Sheets-Sheet 1
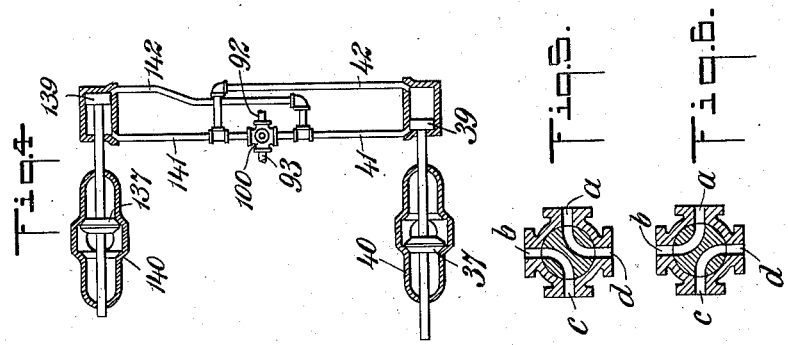
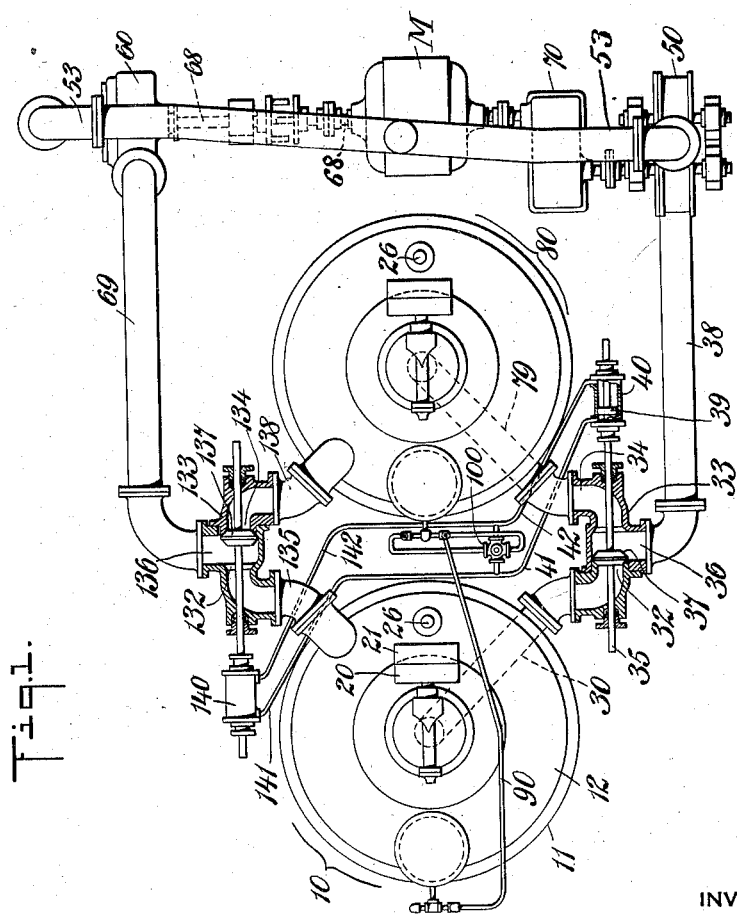
INVENTOR
WILLIAM LEIGH SMITH
by his attorneys Nov. 18, 1930.  W. L. SMITH  1,782,370
APPARATUS FOR PREPARING VISCOUS MIXTURES
Filed Aug. 17, 1929  2 Sheets-Sheet 2
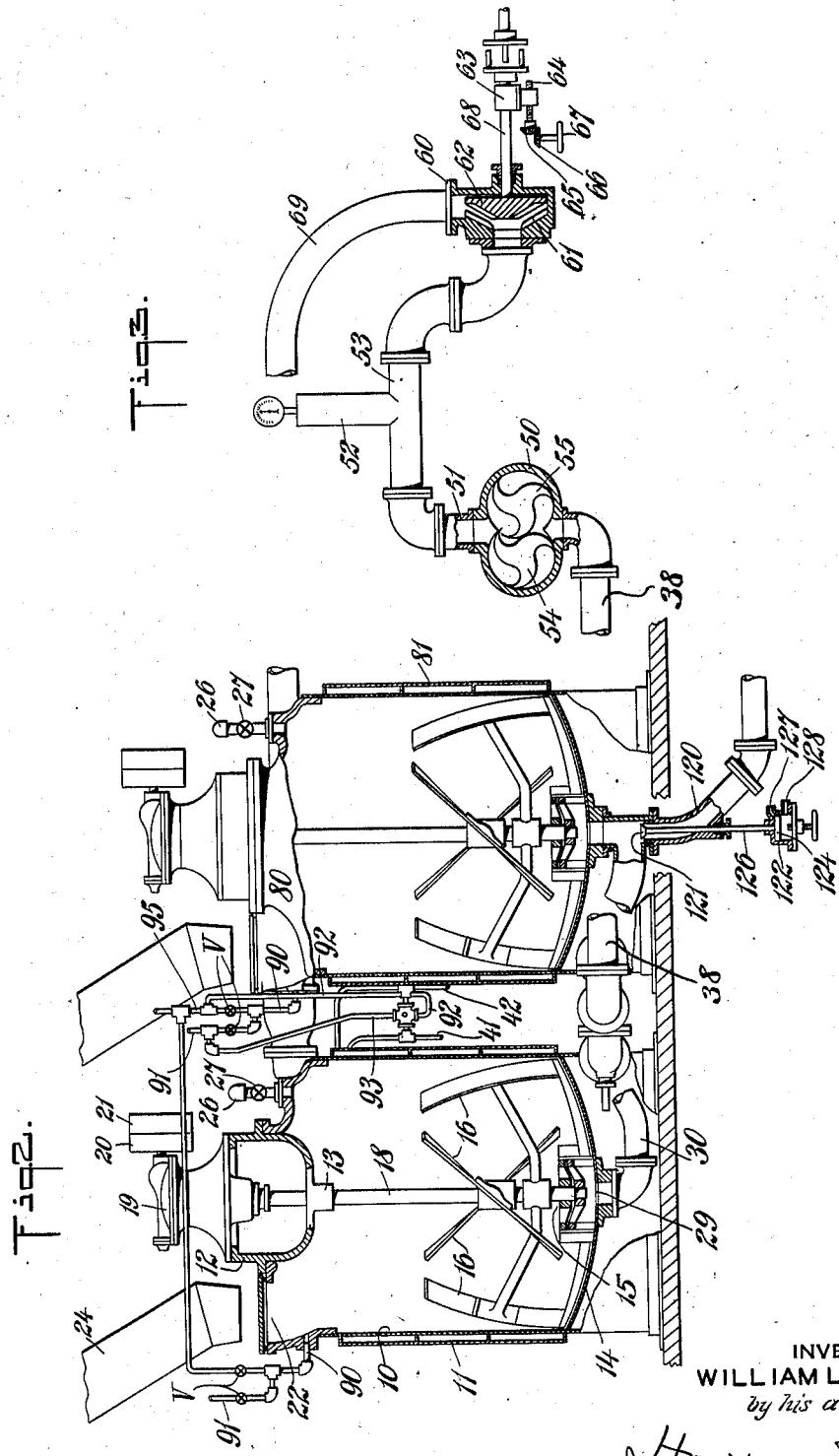
INVENTOR
WILLIAM LEIGH SMITH
by his attorneys Patented Nov. 18, 1930

1,782,370

UNITED STATES PATENT OFFICE

WILLIAM LEIGH SMITH, OF BRANDYWINE SUMMIT, PENNSYLVANIA, ASSIGNOR TO THE VISCOSE COMPANY, OF MARCUS HOOK, PENNSYLVANIA, A CORPORATION OF PENNSYLVANIA

APPARATUS FOR PREPARING VISCOUS MIXTURES

Application filed August 17, 1929. Serial No. 386,727.

This invention relates to apparatus for preparing viscous mixtures and more particularly solutions of cellulose or cellulose esters. In certain technical processes, particularly in dealing with liquids or mixes of relatively high viscosity such as are experienced in the manufacture of rayon, the preparation of solutions, suspensions and colloidal dispersions by the usual apparatus have been subject to many defects. If the standard mixing kettle, provided with the usual revolving paddles or blades, is used, the mechanical treatment necessary is prolonged beyond practical limits, resulting not only in the loss of time but also in excessive power consumption and a poorly mixed product. If the so-called colloidal mills are used, a high degree of dispersion is obtained in a comparatively short time, but the inevitable result of the use of these mills is an excessive increase in temperature of the material and a consequent deterioration and decomposition of the product. A number of special agitators or mixers have been designed in an attempt to overcome the above defects. In general this special equipment consisted of jacketed kettles provided with stirring blades which are so arranged that they tend to force the liquid contents of the kettle through a grinding mechanism which is situated in the bottom of the kettle. In this type of apparatus, due to the lack of uniform circulation, some of the material must necessarily be allowed to float around for protracted periods before it encounters the grinding mechanism.

In view of the above it is an object of my invention to produce an apparatus which will reduce the time required for mixing and which will lower the power consumption during the mixing and which will insure a closer control over the temperature of the mix and result in a more uniformly mixed product than it has been possible to produce with the prior apparatus. Other objects will be apparent as my invention is described in connection with the accompanying drawings. The invention is shown and described embodied in apparatus suitable for grinding cellulosic mixtures, such as viscose.

In the drawings—

Fig. 1 is a plan view of the apparatus which I have devised for preparing cellulosic mixtures, such as viscose;

Fig. 2 is a front elevation view, partly in section, of the mixing tanks and a portion of their associated apparatus as shown in Fig. 1;

Fig. 3 is an end elevation view of a portion of the apparatus shown in Fig. 1 showing particularly the pump and grinding mill;

Fig. 4 is a diagrammatic illustration of the valve mechanism which I use in connection with the apparatus shown in Figures 1, 2 and 3;

Figs. 5 and 6 are cross sectional views of the master valve showing it in its two positions.

Referring now to the drawings it will be noted that my apparatus consists of a cylindrical mixing tank 10 having a cover 12 and a concave bottom 14 and containing a number of mixing blades 16 located in the bottom portion of the tank. These blades are mounted upon a rotatable shaft 18 located along the axis of and within the tank and having its ends mounted in bearings 13, 15 in the top and bottom of the tank. Suitable gear mechanism 19 located in the top of and supported by the tank cover 12, may be provided to drive the mixing blade shaft when power is applied to a driving pulley 20 located above and cooperating with the gear mechanism. An idling pulley 21 may be provided on the shaft of the pulley 20 if desired.

In the top of the tank 10 there is an aperture 22 through which the viscous material may be fed into the tank from a chute 24 located above the tank in such a position as to deliver material coming through it to the aperture 22. Upon the opposite side of the top of the tank from the aperture 22 a pipe line 26, controlled by a valve 27, is connected to the tank 10 in order that liquid for the mixture may be led into the tank at will.

In the bottom of the tank below the bottom mounting 15 of the mixing blade shaft 18 in an aperture 29 connected with a pipe line 30 running to one port 32 of a three port outlet valve 33. The second port 34 of this outlet valve 33 may be connected by pipe line 79, to a second mixing tank 80 which may be of similar or of identical construction to the first mixing tank 10. The third port 36 of this valve 33 connects, through a conduit or pipe line 38 connected thereto, with a rotary gear pump 50. The valve 33 includes a reciprocating piston rod 35 upon which is mounted a valve disc 37 adapted to close either the port 32 connecting with the first tank 10 or the port 34 connecting with the second tank 80 as desired.

The valve 33 may be pneumatically controlled by prolonging the piston rod 35 to make it extend through a cylinder 40 and mounting a piston 39 on the rod within the cylinder. Air pipes 41, 42 are connected to each end of the cylinder in order that compressed air may be admitted to the cylinder on either side of the piston to actuate it and thereby actuate the valve head 37.

I have found that the mixing in the tanks 10 and 80 does not always break up all the lumps in the mixture and therefore I pass the mixture through a grinding mill 60 to more thoroughly pulverize and disperse the solid matter in the mixture.

To provide a positive feed of the viscous mixture to the grinding mill 60, the rotary gear pump 50 is inserted in the line between the mixing tank and the grinding mill. As the mixture comes from the mixing tanks it moves along pipe line 38 to the rotary gear pump 50 and is delivered from the outlet 51 of the gear pump past an air cushion chamber 52, in the conducting pipe line 53 from the gear pump, to the grinding mill 60.

The gear pump may be of any suitable design. For the sake of illustration I have shown, as a preferred construction, a pump having two intermeshing gears 54, 55, each gear having three teeth and being driven from motor M through reduction gearing 70.

The grinding mill 60 resembles somewhat a centrifugal pump, the liquid or viscous material entering axially and then passing between two conical or radial surfaces 61, 62, one of which (61) is stationary while the other (62) is rotatable. The two adjacent surfaces have suitable cutting blades or bars for grinding or reducing lumpy or other material not yet dispersed or in solution in the mix which is delivered to the pump. The depth of the blades or the bars and the clearance between the stator and rotor elements diminishes toward the outer edge of the grinding mill until there cease to be any bars or cutting members, only smooth surfaces remaining. The rotor is driven by shaft 68 connected with the driving motor M, through an adjustable coupling about to be described.

Means may be provided to regulate the clearance or distance between the stator and rotor elements of the mill thus regulating the degree of grinding and milling of the suspended material in the mixture. This means diagrammatically shown in Fig. 3 may consist of an adjustable sliding bearing 63 controlled by a screw and thread adjustment gear 64 connected thereto. This gearing 64 may be actuated through intermeshing bevel gears 65, 66, by a hand wheel 67, the gear 65 being fixed on the same shaft as the screw of the gear 64, while the gear 65 is fixed on the shaft of the hand wheel 67 which is at right angles to the screw gear shaft.

The viscous mixture may be delivered from the grinding mill to a pipe line 69 leading from the grinding mill to a three port re-entry valve 133 which is located at the tops of the mixing tanks 10, 80, and which is connected to the tops of the mixing tanks by pipe connections 135 and 138. By means of this re-entry valve the material coming from the grinding mill may be directed back to the mixing tank 10 to go through the process just described once more or the material may be directed into the second mixing tank 80 to go through the process in that tank and be delivered thereafter either to the pump and grinding mill again or discharged through a discharge passage as will be presently described. I have found that the temperature of the mixture can be kept low and a finished product obtained quickly if the mixture is passed through the grinding equipment at a rapid rate of flow and a partial mixing accomplished at each passage. The mixture is passed through a number of times. In this way the heat caused in small doses by the grinding equipment is taken away by the rapidly moving stream into the large cooling tanks.

The construction of the re-entry valve 133 in the pipe line 69 from the grinding mill to the mixing tanks may be of identical construction to the valve 33 of the outlet pipe line 37 at the bottoms of the mixing tanks. Thus the port 132 leads through conduit 135 to the mixing tank cover 12, the port 134 leads through conduit 138 to the mixing tank 80 and the port 136 connects with the pipe line 69. The air cylinder 140 by which the valve 133 is operated contains a piston which controls the valve head 137 in the same manner that the valve head 37 of the valve 33 is controlled. Pipe lines 141 and 142 are connected to each end of the cylinder 140 and connect with pipe lines 41 and 42 and in order that the outlet re-entry valves may be simultaneously controlled both of these pairs of lines are connected to a master air valve 100. This master valve 100 is so constructed that compressed air may be directed to the respective ends of the cylinders 40 and 140 and the valves 33 and 133 will be actuated in opposite directions so that upon re-entry into the tank 10 through port 132 of the material coming from the grinding mill the outlet port 32 will be closed to hold this material within that tank; similarly the outlet port 34 is closed when the re-entry port 134 is open. Air may be delivered to this master valve through pipe line 92 connected to the pressure main 95.

The operation of the master valve 100 and automatic valves 33, 133, controlled thereby is as follows: When the master valve is in the position shown in Figure 5, air entering the port $a$ from the pressure main 92 connected thereto, goes down the pipe 41 and up the pipe 142 into the cylinders 40 and 140 to move the piston 39 to the right (Fig. 4) and the piston 139 within cylinder 140, to the left. The exhaust air passes out through pipes 42 and 141 to the port $b$ and then through the valve to the exit port $c$ to which is connected the exhaust pipe 93.

When the valve 100 is as shown in Figure 6 the air enters through port $a$ going out through port $b$ to pipes 42 and 141 so as to enter the cylinders 40, 140 and actuate the valves 33, 133. The exhaust air leaves through pipes 142, 41, entering the valve at port $d$ and leaving it at port $c$ and exhaust pipe 93 connected thereto.

The mixing tanks 10 and 80 may be surrounded by temperature control jackets 11, 81 through which may pass some cooling medium, the flow of which may be controlled by any suitable means in order that the temperature of the tanks may be controlled and the mixture thus protected.

The use of the rotary gear pump 50, to force the mixture to the grinding mill, may be dispensed with if the tanks 10 and 80 are closed and air pressure within them is provided. In such a case air pressure pipe lines 90 connected to the top portion of the tanks and to the pressure mains 95 may provide the necessary air pressure to the tanks. Each of these pipe lines may have branch lines 91 connected thereto to provide an exhaust for the compressed air after the viscous mixture has passed out of the tank. Each of the lines is provided with a valve V therein to regulate the inflow and exit of the compressed air at the proper times.

In order that the mixture may finally be delivered to whatever subsequent stages it is to be subject after having gone through the grinding process, I provide at the bottom of tank 80 a delivery outlet pipe line 120 having a reciprocating valve 121 therein. This pipe line 120 is connected to the outlet pipe line 79 which in turn leads to the tank 80. This valve 121 may be operated by compressed air delivered to an air cylinder 122 having a piston 124 therein which is connected to the valve 121 by rod 126 and which is acted upon by the air admitted through air conduits 127, 128.

In operating the apparatus the material may be delivered through the delivery chute 24 to the first tank 10 where it is mixed with liquid admitted to this tank through a liquid inlet valve 27 while the temperature of the mix is controlled by the temperature control jacket 11 on this tank. During this operation the outlet pipe line is closed by the valve 33. When this mixing operation has been carried on for a sufficient length of time the port 32 is opened by the pneumatic actuation of the valve 33 through the admission of compressed air to the left end (see Fig. 1) of the air cylinder 40 which controls this valve 33. The mix may then be led through the pipe line 38 from the tank 10 to the rotary gear pump 50 by which the mix is forced along the pipe line 53 to the grinding mill 60 in which the grinding and milling of the material is carried out, breaking up any lumps in the mixture and delivering the mixture to the pipe line 69 which leads to the re-entry valve 133. The mixture may now be led either through the first tank 10 again or through the second tank 80. After the mixture has gone through this process the desired number of times and is in condition to be delivered to other apparatus and put through other processes it may be discharged from the second tank 80 through the discharge passage 120 by opening the air controlled discharge valve 121 in this pipe line, this discharge valve having been closed all during the process prior to the time for the final discharge of the mixture. Of course, if desired, the valves may all be actuated manually instead of pneumatically as shown.

Thus it will be seen that I have provided a simple and efficient apparatus whereby a complete and uniform mix may be made in a much shorter period of time and with a much lower consumption of power than has been necessary in the past. At the same time I am able to produce a much more uniform product than has been possible with previous apparatus.

Obviously many changes and modifications may be made within the scope of my invention, therefore I do not limit myself to the specific apparatus shown, but I claim:

1. In an apparatus for preparing viscous mixtures, the combination of a plurality of mixing tanks, an outlet valve adapted to let the mixtures flow out of any one of said tanks, outlet conduits leading from said tanks to said outlet valve, a pump, a conduit leading from said valve to said pump, a grinding mill, a reentry valve adapted to direct the mixtures back into any other of said tanks, a conduit leading from said pump to said mill and a conduit leading from said mill to said reentry valve, conduits leading from said reentry valve to said tanks, one of said tanks also having a valved discharge conduit, said conduits and valves being constructed and operable in such a way that the mixture may be lead through said apparatus as many times as desired.

2. In an apparatus for preparing cellulosic mixtures, the combination of a plurality of mixing tanks, temperature control jackets on said tanks, a grinding mill, a valved discharge passage leading from one of said tanks, conduits connecting said tanks and mill, and valves in said conduits, certain of said valves being adapted to let out said mixtures from any one of said tanks, and certain of said valves being adapted to direct said mixtures back into any other of said tanks whereby the mixture may be led through the apparatus any desired number of times before it is discharged.

3. In an apparatus for preparing viscous mixtures, the combination of a plurality of mixing tanks, a grinding mill, a multi-ported outlet valve adapted to let the mixtures flow out of any one of said tanks, conduits leading from said tanks to said valve and from said valve to said mill, a multi-ported reentry valve adapted to direct the mixtures back into any other of said tanks, conduits leading from said mill to said reentry valve and from said reentry valve to said tanks whereby the mixture may be led through the apparatus as many times as desired.

4. In an apparatus for preparing cellulosic mixtures, the combination of a plurality of mixing tanks, a grinding mill, a multi-ported outlet valve adapted to let the mixtures flow out of any one of said tanks, conduits leading from said tanks to said valve and from said valve to said mill, a multi-ported reentry valve adapted to direct the mixtures back into any other of said tanks, conduits leading from said mill to said reentry valve and from said reentry valve to said tanks whereby the mixture may be led through the apparatus as many times as desired, and a discharge passage having a discharge controlling valve therein whereby the mixture may be led away from said apparatus.

5. In an apparatus for preparing viscous mixtures, the combination of a plurality of mixing tanks, a grinding mill, a multi-ported outlet valve adapted to let the mixtures flow out of any one of said tanks, conduits leading from said tanks to said valve and from said valve to said mill, a multi-ported reentry valve adapted to direct the mixtures back into any other of said tanks, conduits leading from said mill to said reentry valve and from said reentry valve to said tanks whereby the mixture may be led through the apparatus as many times as desired, and compressed-fluid-operated means to operate said reentry and outlet valves simultaneously.

6. In an apparatus for preparing viscous mixtures, the combination of a plurality of mixing tanks, a grinding mill, a multi-ported outlet valve adapted to let the mixtures flow out of any one of said tanks, conduits leading from said tanks to said valve and from said valve to said mill, a multi-ported reentry valve adapted to direct the mixtures back into any other of said tanks, conduits leading from said mill to said reentry valve and from said reentry valve to said tanks whereby the mixture may be led through the apparatus as many times as desired, and means to force the mixture from said tanks to said grinding mill.

7. In an apparatus for preparing viscous mixtures, the combination of a plurality of mixing tanks, a grinding mill, a multi-ported outlet valve adapted to let the mixtures flow out of any one of said tanks, conduits leading from said tank to said valve and from said valve to said mill, a multi-ported reentry valve adapted to direct the mixtures back into any other of said tanks, conduits leading from said mill to said reentry valve and from said reentry valve to said tanks whereby the mixture may be led through the apparatus as many times as desired, said valves being simultaneously operable by fluid pressure from a master valve.

8. In an apparatus for preparing viscous mixtures, the combination of a plurality of mixing tanks, outlet conduits associated with said tanks, reentry conduits also associated with said tanks, multi-ported outlet and reentry valves connected to said outlet and reentry conduits respectively, means associated with said valves to automatically operate them, and control means for said operating means, said control means operating to close the outlet conduits of the tanks when their respective reentry valve conduits are opened, and means adapted to conduct said mixtures from said outlet valve to said reentry valve, whereby the mixture may be led through the apparatus any number of times.

9. In an apparatus for preparing viscous mixtures, the combination of a plurality of mixing tanks, outlet conduits associated with said tanks, reentry conduits also associated with said tanks, multi-ported outlet and reentry valves connected to said outlet and reentry conduits respectively, means associated with said valves to automatically operate them, and control means for said operating means, said control means operating to close the outlet conduit of one tank when the reentry port to said tank is open and simultaneously to close the reentry port to the other tank and to open its outlet conduit, and means adapted to conduct said mixtures from said outlet valve to said reentry valve, whereby the mixture may be led through the apparatus any number of times.

In testimony whereof I have signed my name to this specification.

WILLIAM LEIGH SMITH.